United States Patent
Ainscow et al.

(10) Patent No.: US 10,210,127 B2
(45) Date of Patent: Feb. 19, 2019

(54) STORAGE SYSTEM CABLING ANALYSIS

(71) Applicant: International Business Machines Corporation, Armonk, NY (US)

(72) Inventors: Alexander H. Ainscow, Winchester (GB); Carlos F. Fuente, Southampton (GB); Chelsea L. Jones, Ellesmere Port (GB)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 14/797,401

(22) Filed: Jul. 13, 2015

(65) Prior Publication Data

US 2017/0017602 A1    Jan. 19, 2017

(51) Int. Cl.
  *G06F 13/40* (2006.01)
  *G06F 13/16* (2006.01)
  *H04L 12/26* (2006.01)
  *H04L 12/24* (2006.01)

(52) U.S. Cl.
  CPC .......... *G06F 13/4063* (2013.01); *G06F 13/16* (2013.01); *H04L 41/12* (2013.01); *H04L 43/0811* (2013.01); *H04L 43/045* (2013.01)

(58) Field of Classification Search
  CPC .................................................. H04L 43/045
  See application file for complete search history.

(56) References Cited

U.S. PATENT DOCUMENTS

| | | | |
|---|---|---|---|
| 7,275,103 B1 | 9/2007 | Thrasher et al. | |
| 7,383,330 B2 | 6/2008 | Moran et al. | |
| 7,873,744 B2 | 1/2011 | Chen et al. | |
| 8,352,866 B2 | 1/2013 | Bethune et al. | |
| 9,225,730 B1* | 12/2015 | Brezinski | G06F 21/00 |
| 2005/0010688 A1* | 1/2005 | Murakami | G06F 13/4081 |
| | | | 709/245 |
| 2008/0307104 A1* | 12/2008 | Amini | G06F 17/30516 |
| | | | 709/231 |
| 2012/0039331 A1 | 2/2012 | Astigarraga et al. | |

OTHER PUBLICATIONS

Staley et al., "Fibre Channel based Storage Area Network Modeling using OPNET for Large Fabric Simulations: Preliminary Work", 32nd IEEE Conference on Local Computer Networks, © 2007 IEEE, DOI 10.1109/LCN.2007.51, pp. 234-236.

* cited by examiner

*Primary Examiner* — Farley Abad
(74) *Attorney, Agent, or Firm* — Steven F. McDaniel; Arnold B. Bangali

(57) ABSTRACT

A method includes monitoring port login requests initiated by elements of a storage system, the storage system comprising interconnection cabling, constructing a connection graph corresponding to the port login requests, wherein each edge of the connection graph corresponds to a specific port login request and each vertex of the connection graph corresponds to a port within the storage system, and using the connection graph to evaluate the interconnection cabling of the storage system. A corresponding computer program product and computer system are also disclosed herein.

20 Claims, 6 Drawing Sheets

STORAGE SYSTEM CABLING ANALYSIS

BACKGROUND OF THE INVENTION

The present invention relates generally to storage systems and specifically to software tools for optimizing storage systems.

Storage systems typically include a number of device ports that can be interconnected with cabling such as fibre channel cables in a wide variety of interconnection patterns (i.e., topologies). Often such systems change over time due to a variety of factors such as changing storage requirements, equipment failures, and the addition or removal of hosts that require storage services. Assessing the efficacy of a current interconnection pattern and the presence of unused ports is often a time-consuming task that must be repeated on a regular basis in order to maintain high system performance.

SUMMARY

A method, executed by at least one processor, includes monitoring port login requests initiated by elements of a storage system, the storage system comprising interconnection cabling, constructing a connection graph corresponding to the port login requests, wherein each edge of the connection graph corresponds to a specific port login request and each vertex of the connection graph corresponds to a port within the storage system, and using the connection graph to evaluate the interconnection cabling of the storage system. A corresponding computer program product and computer system are also disclosed herein.

DETAILED DESCRIPTION

The embodiments disclosed herein enable storage system interconnection cabling analysis and improvement.

Figure 1:
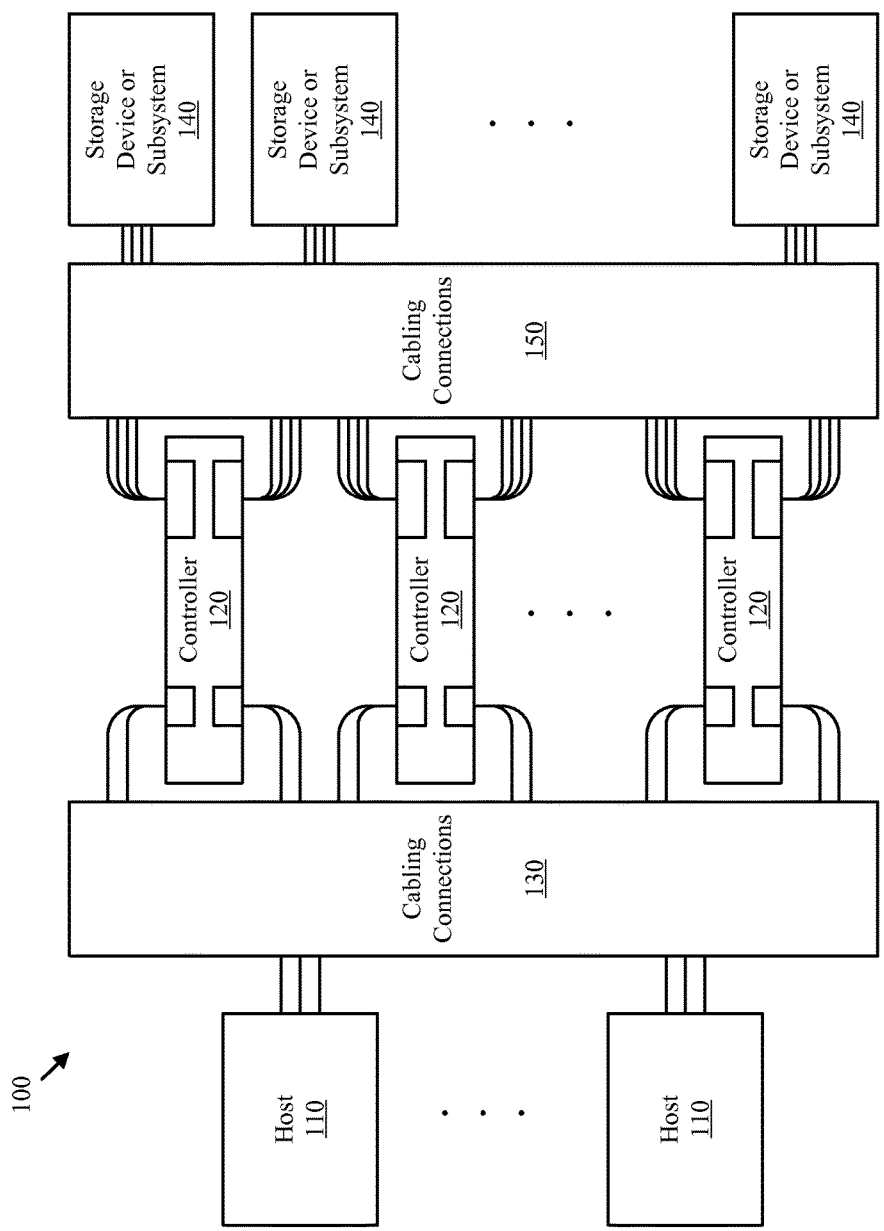
FIG. 1 is a block diagram depicting one example of a data processing environment wherein at least one embodiment of the claimed invention may be utilized.

FIG. 1 is a block diagram depicting one example of a data processing environment 100 wherein at least one embodiment of the claimed invention may be utilized. As depicted, the data processing environment 100 includes one or more hosts 110 connected to one or more controllers 120 via a set of cabling connections 130. In turn the controllers 120 are connected to one or more storage devices or subsystems 140 via a set of cabling connections 150. The data processing environment may enable each host 110 to access data on each storage device or subsystem 140.

A variety of storage system performance metrics may be dependent on the cabling connections 130 and 150. For example, data accessibility, bandwidth, latency, fault tolerance, and the like may be dependent on the cabling connections 130 between the hosts 110 and the controllers 120 as well as the cabling connections 150 between the controllers 120 and the storage devices or subsystems 140. Furthermore, the performance metrics may be dynamic due to changing storage requirements, equipment failures, the addition or removal of equipment, and the like. Consequently, analysis of the efficacy of the cabling connections 130 and 150, or the like, is preferably repeated on a regular basis in order to maintain high system performance.

Figure 2A:
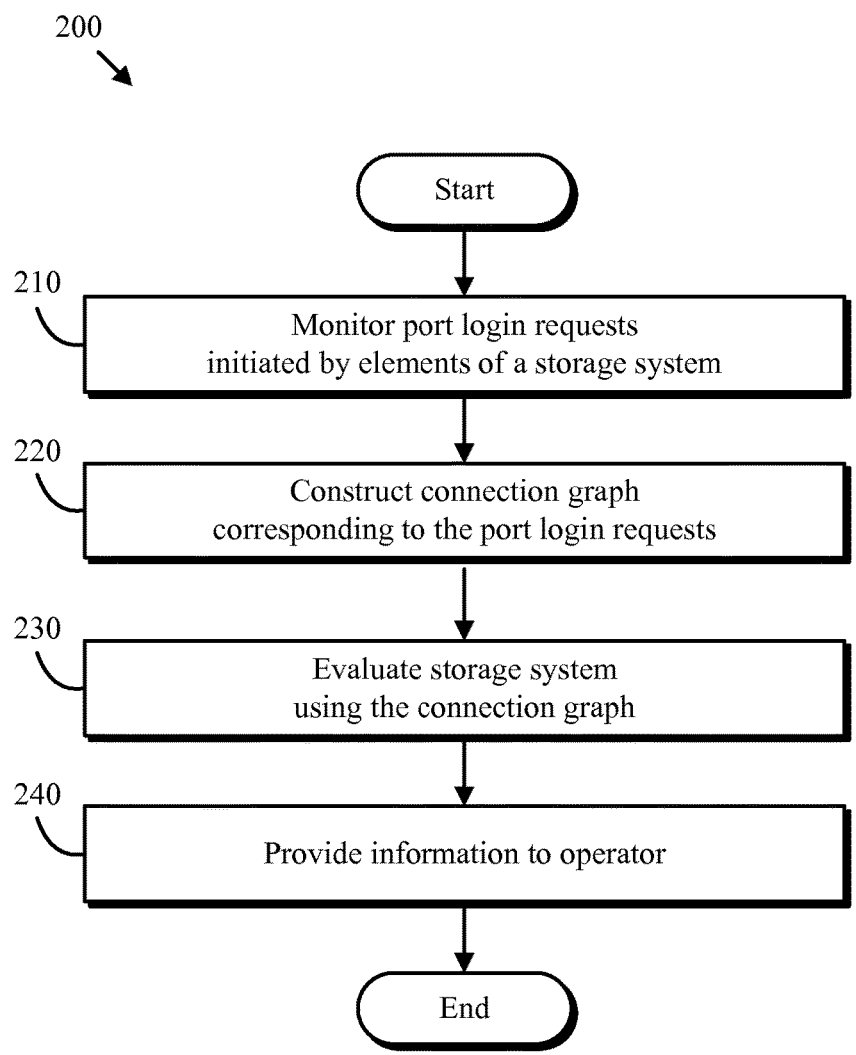
FIG. 2A is a flowchart depicting one example of an interconnection analysis method in accordance with at least one embodiment of the claimed invention.

The embodiments disclosed herein enable the analysis of cabling interconnections within environments that utilize storage systems such as the data processing environment 100. For example, FIG. 2A is a flowchart depicting one example of an interconnection analysis method 200 in accordance with at least one embodiment of the claimed invention. As depicted, the interconnection analysis method 200 includes monitoring (210) port login requests corresponding to a storage system, constructing (220) a connection graph, evaluating (230) the storage system, and providing (240) information to an operator. The interconnection analysis method 200 enables analysis of cabling interconnections associated with a storage system.

Monitoring (210) port login requests corresponding to a storage system may include providing a login handing routine on a controller, or other storage system device, that collects information from each received login request. The collected information may include the name of the originating device, the name of the receiving device, the port identifiers for both the originating device and the receiving device, and the like.

Constructing (220) a connection graph may include constructing a graph where vertices correspond to ports and edges correspond to login requests. Consequently, each login request results in an edge within the connection graph that connects vertices that correspond to the ports involved in the login request. Each edge of the connection graph may also correspond to an interconnection cable within the storage system.

The login requests that are monitored may conform to a storage connection standard such as the fibre channel standard. One of skill in the art will appreciate that constructing a connection graph (e.g., via software executing on one or more processors) may include allocating data structures corresponding to edges and vertices and defining various relationships between the edges and vertices via pointers, identifiers, indices, or the like.

In some embodiments, each element (i.e., device) within a storage system such as a host, controller, storage device, or storage subsystem provides information regarding the number of ports that are available on that device and/or the port identifiers for each port on the device. In other embodiments, such information is provided by a system administrator. When such information is available, construction of the connection graph may commence by defining a vertex for each port in the storage system. Subsequently, each login request may add an edge to the connection graph. Consequently, isolated vertices within the connection graph (i.e., vertices that are not connected to an edge) correspond to unused ports that were not referenced in any login request.

Evaluating (230) the storage system may include using the connection graph to analyze the storage system. For example, the connectivity and connectivity balance between the hosts, controllers, and storage devices or subsystems within a storage system may be determined from the connection graph. Various graph traversal algorithms known to those skilled in the art of computer science may be used to facilitate evaluation.

Comparisons with previous connection graphs may be made to determine if expected or unexpected changes have occurred. Changes in the connection graph from a previous connection graph may be determined. Such changes include missing or added vertices, missing or added edges, and changed edge to vertex connections. The detected changes may correspond to changes in the monitored storage system.

In conjunction with evaluating (230) the storage system, one or more performance metrics for the storage system may be collected such as data throughput and packet latency. The performance metrics may be stored and associated with the corresponding connection graph or a configuration file for the storage system. The stored information may facilitate future comparisons and analysis.

Providing (240) information to an operator may include presenting the connection graph to the operator and/or highlighting or indicating changes that have occurred. Other examples of provided information include ports that are unused, connection imbalances, current system performance, performance changes, and the like. The information may be provided in graphical, textual, or tabular forms or a combination thereof.

Figure 2B:
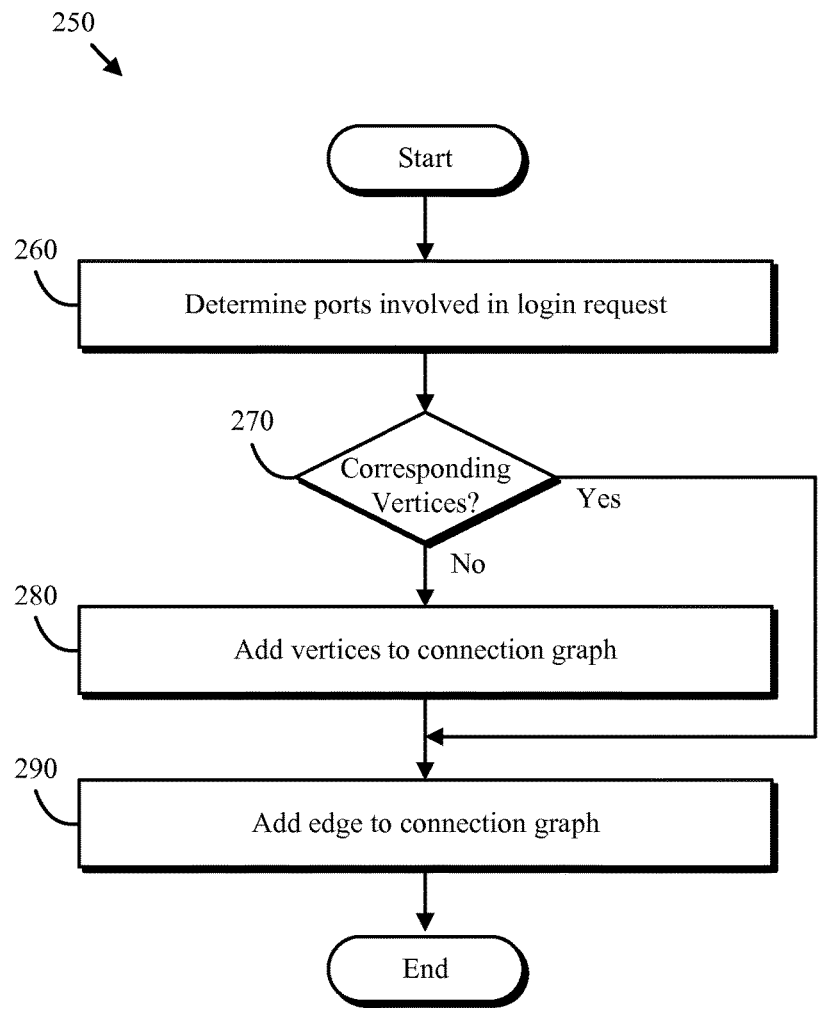
FIG. 2B is a flowchart depicting one example of a connection graph construction method in accordance with at least one embodiment of the claimed invention.

FIG. 2B is a flowchart depicting one example of a connection graph construction method 250 in accordance with at least one embodiment of the claimed invention. As depicted, the connection graph construction method 200 includes determining (260) ports involved in a login request, determining (270) whether corresponding vertices exist, adding (280) vertices to the connection graph, and adding (290) an edge to the connection graph. The connection graph construction method 200 may be conducted in response to each login request within a storage system.

Determining (260) ports involved in a login request may include parsing the login request to determine one or more port identifiers and a device identifier. In some embodiments, both the sending and receiving ports are explicitly identified in the login request. In certain embodiments, each port identifier and device identifier is a globally unique identifier such as a world-wide port name (WWPN) or a world-wide node name (WWNN), respectively.

Determining (270) whether corresponding vertices exist may include searching the connection graph or a vertex list to determine whether a vertex corresponding to each involved port already exists. If not, the method advances by adding (280) vertices to the connection graph.

Adding (280) vertices to the connection graph may include allocating a data structure or instantiating an object for each vertex that is to be added. The data structure or instantiated object may be used to store information for the vertex including a reference or index to a connected edge or vertex. In some embodiments, a port name (e.g., WWPN) and a device name (e.g., WWNN) are stored in the data structure or instantiated object. In certain embodiments, vertices that have a common device name are clustered or linked to facilitate analysis.

Similar to adding (280) vertices, adding (290) an edge to the connection graph may include allocating a data structure or instantiating an object to store information for the edge including references or indices to connected vertices. Subsequent to adding (290) an edge, the depicted method terminates until another login request occurs.

Figure 3A:
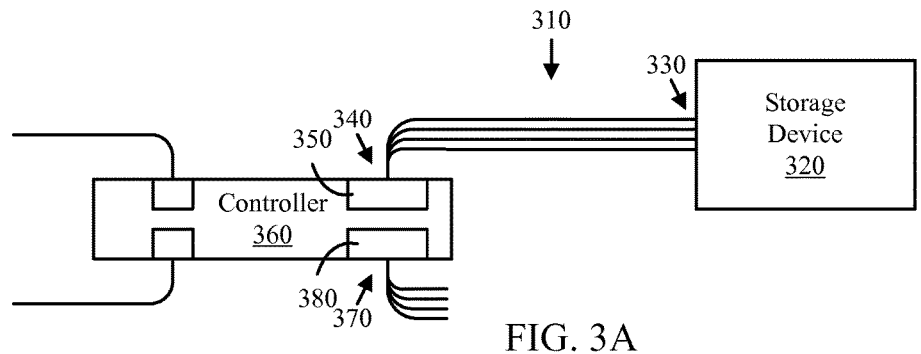
FIGS. 3A and 3D are functional block diagrams and FIGS. 3B and 3C are illustrations of connection graphs depicting a first basic example of analyzing and improving interconnection cabling in a storage system in accordance with at least one embodiment of the claimed invention.
Figure 3B:
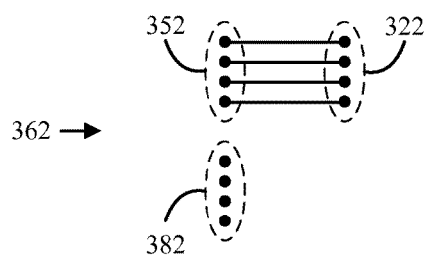
Figure 3C:
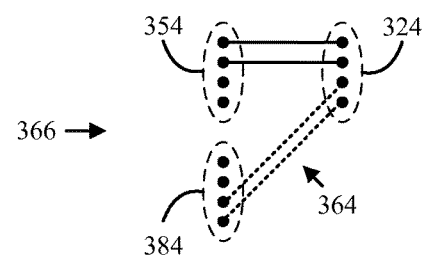
Figure 3D:
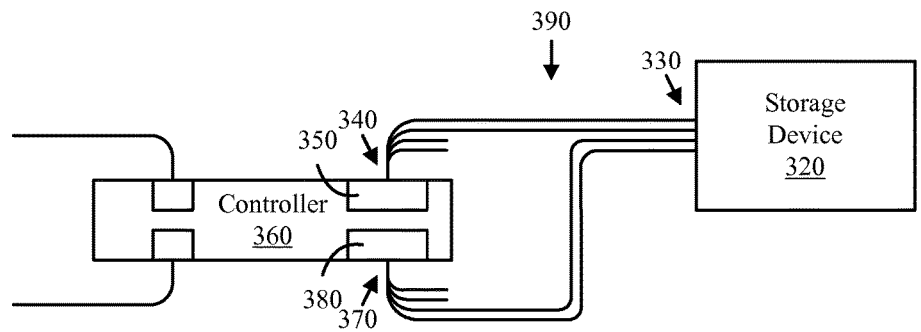

FIGS. 3A and 3D are functional block diagrams and FIGS. 3B and 3C are illustrations of connection graphs depicting a first basic example of analyzing and improving interconnection cabling in a storage system in accordance with at least one embodiment of the claimed invention. As depicted, the first basic example includes a unbalanced configuration 310 which is determined using the above described methods.

For example, the storage device 320 shown in FIG. 3A may initiate a login request for each originating port 330 on the storage device 320. The login requests may be received by corresponding receiving ports 340 on an adapter 350 within a controller 360. A connection graph 362 corresponding to the login requests may be constructed by the controller 360. The data structures or objects (not shown) corresponding to the vertices of the connection graph may include the device name (not shown) to which each port belongs. Since each originating port 330 belongs to the same storage device 320, each corresponding vertex within the connection graph may be associated with the same device name (e.g., WWNN) and be clustered or linked into a device group 322 corresponding to the storage device 320. Furthermore, given that each receiving port 340 belongs to the same adapter 350, each corresponding vertex within the connection graph may be associated with the same device name (e.g., WWNN) and be clustered or linked into a device group 352 corresponding to the adapter 350. In addition, a set of unused ports 370 corresponding to an unused adapter 380 may be represented in the connection graph as isolated vertices with a device name that is different than the name of the adapter 350 or the storage device 320. Therefore the isolated vertices may be clustered or linked into a group 382 corresponding to the unused adapter 380.

An analysis of the resulting connection graph 362 created by the method 200 (e.g., see FIG. 3B) reveals that the ports 340 on the adapter 350 are completely utilized while the ports 370 on the adapter 380 are unused. Based on the analysis, a suggestion is made to a user (e.g., via proposed links 364 displayed within a desired connection graph 366 shown in FIG. 3C), or the user infers from presented information, that two of the links connected to adapter 350, should instead be connected to adapter 380, resulting in the balanced configuration 390 shown in FIG. 3D.

Figure 4A:
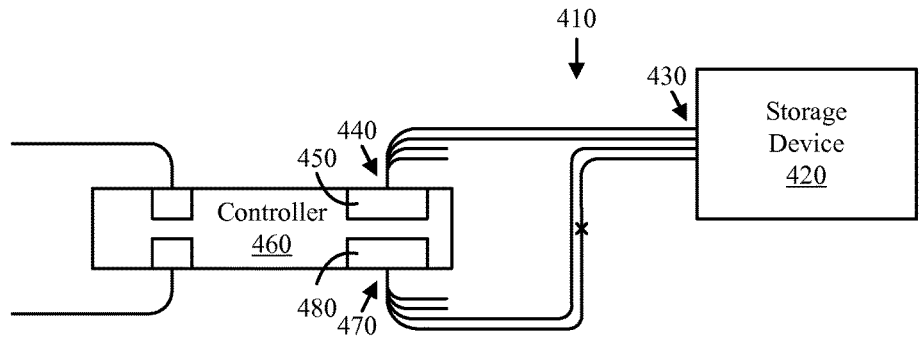
FIGS. 4A and 4D are functional block diagrams and FIGS. 4B and 4C are illustrations of connection graphs depicting a second basic example of analyzing and improving interconnection cabling in a storage system in accordance with at least one embodiment of the claimed invention.
Figure 4B:
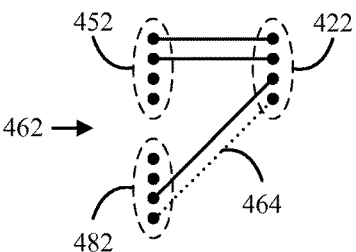
Figure 4C:
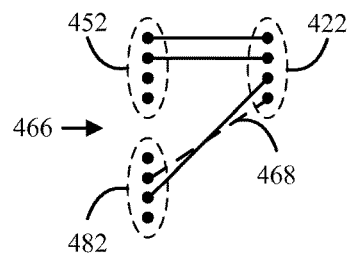
Figure 4D:
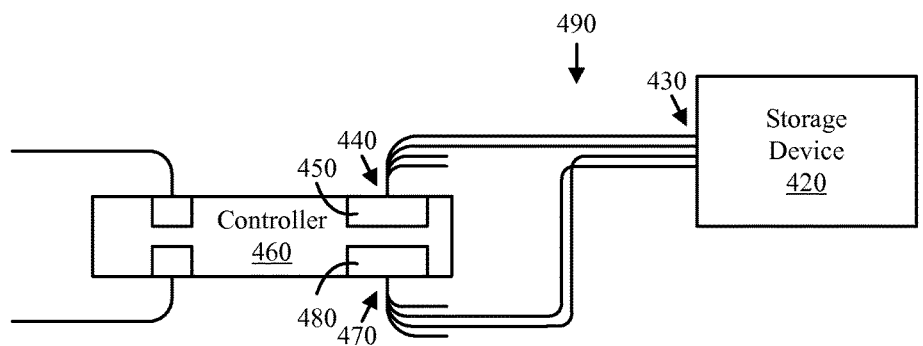

FIGS. 4A and 4D are functional block diagrams and FIGS. 4B and 4C are illustrations of connection graphs depicting a second basic example of analyzing and improving interconnection cabling in a storage system in accordance with at least one embodiment of the claimed invention. As depicted, the second basic example includes a faulty configuration 410 which is determined using the above described methods.

For example, the storage device 420 shown in FIG. 4A may initiate a login request for each originating port 430 on the storage device 420. The login requests may be received by corresponding receiving ports 440 on an adapter 450 within a controller 460 as well as receiving ports 470 on an adapter 480 within the controller 460. A connection graph 462 corresponding to the login requests may be constructed by the controller 460. The data structures or objects corresponding to the vertices of the connection graph may include the device name (not shown) to which each port belongs. Since each originating port 430 belongs to the same storage device 420, each corresponding vertex within the connection graph may associated with the same device name (e.g., WWNN) and be clustered or linked into a device group 422 corresponding to the storage device 420. Furthermore, given that each receiving port 440 belongs to the same adapter 450, each corresponding vertex within the connection graph may be associated with the same device name (e.g., WWNN) and be clustered or linked into a device group 452 corresponding to the adapter 450. Furthermore, the receiving ports 470 corresponding to an adapter 480 may be represented in the connection graph as vertices that are clustered or linked into a group 482 corresponding to the adapter 480.

An analysis of the resulting connection graph (e.g., created by the method 200) reveals that the two ports 440 on the adapter 450 are utilized while only a single port 470 on the adapter 480 is used due to a fault somewhere in one of the end-to-end connections between the storage device 420 and the adapter 480. A comparison with a previous connection graph (e.g., corresponding to FIG. 3D) reveals that a port on the adapter 480 and a port on the storage device 420 are no longer used. Information about the discovered changes may be presented to the user (e.g., as a phantom connection 464). Furthermore, it is suggested to the user (e.g., via a balanced connection graph 466 illustrated in FIG. 4C), or the user infers from presented information, that an additional link 468 should be made between the adapter 480, and the storage device 420, resulting in the balanced configuration 490 shown in FIG. 4D.

Figure 5:
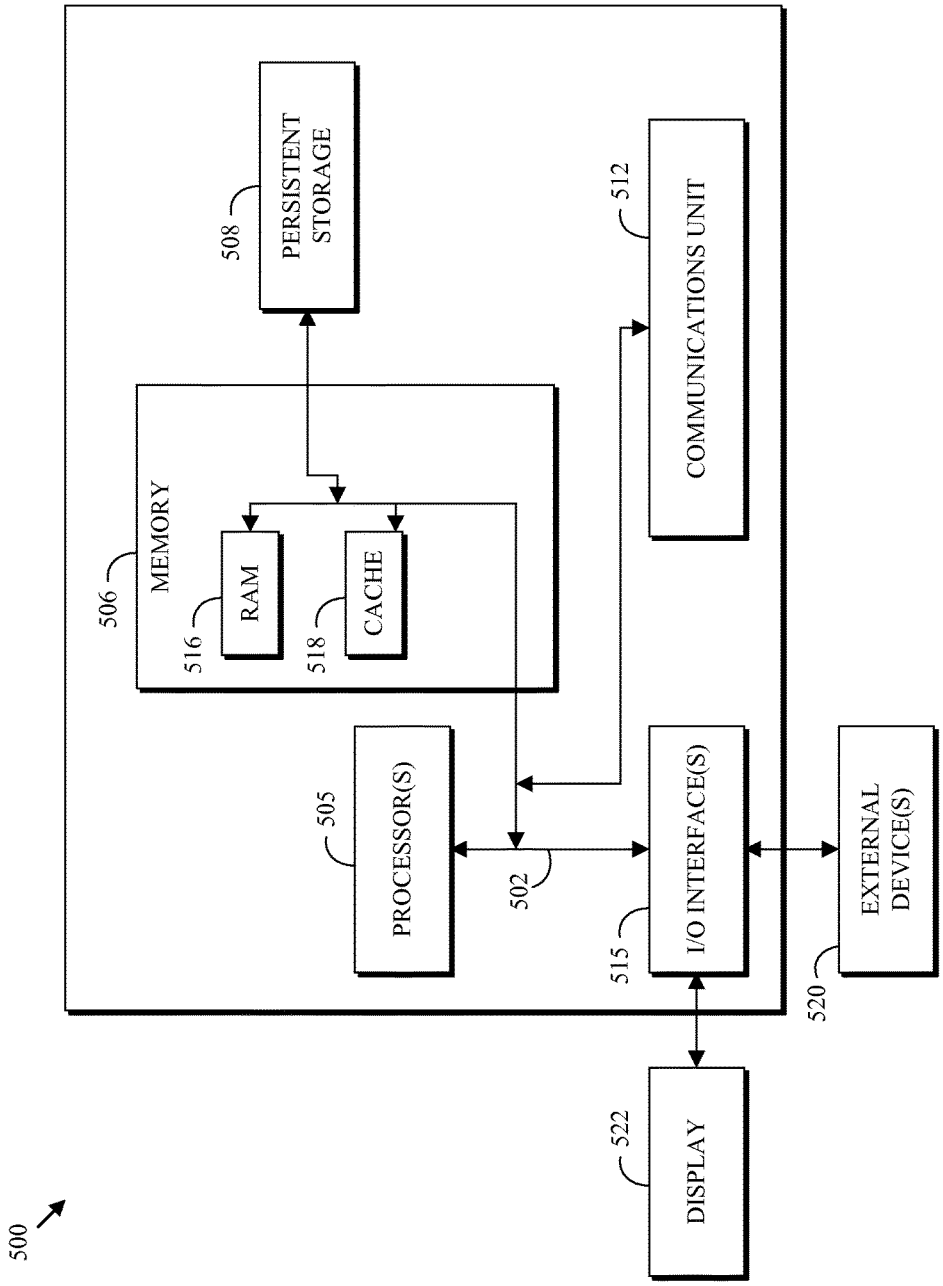
FIG. 5 is a block diagram depicting one example of a computing apparatus (e.g., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by at least one processor, the method comprising:

monitoring, via one or more processors, port login requests initiated by elements of a storage system, the storage system comprising interconnection cabling, the elements comprising at least one host and at least one controller;

determining, via one or more processors, one or more port identifiers and a device identifier for each of the port login requests;

constructing from the one or more port identifiers and the device identifier for each of the port login requests, via the one or more processors, a connection graph corresponding to the port login requests, wherein each edge of the connection graph corresponds to a specific port login request and each vertex of the connection graph corresponds to a port within the storage system;

analyzing the connection graph to determine expected or unexpected changes between hosts, controllers, and storage devices or subsystems within the storage system, wherein expected or unexpected changes include missing or added vertices, missing or added edges, and changed edge to vertex connections of the storage system; and storing one or more data packet latency performance metrics of the storage system, based on the expected or unexpected changes, to facilitate future comparisons and analysis of the storage system, wherein the performance metrics include data accessibility, bandwidth, latency, and fault tolerance of the at least one host and the at least one controller, and wherein the performance metrics are dynamic due to changing storage requirements, equipment failures, and equipment removal of the at least one host and the at least one controller.

2. The method of claim 1, further comprising determining, via the one or more processors, a performance metric for the storage system.

3. The method of claim 2, further comprising associating, via the one or more processors, the performance metric with the connection graph or the interconnection cabling.

4. The method of claim 1, further comprising determining, via the one or more processors, changes in the connection graph from a previous connection graph.

5. The method of claim 4, further comprising informing, via the one or more processors, a user of the changes.

6. The method of claim 1, wherein each edge of the connection graph corresponds to an interconnection cable.

7. The method of claim 1, further comprising associating, via the one or more processors, a port name and a device name with each vertex of the connection graph.

8. The method of claim 7, further comprising clustering, via the one or more processors, vertices that have a common device name.

9. The method of claim 1, wherein a port login request is received by a receiving port on a receiving device and sent by an originating port on an originating device.

10. The method of claim 9, wherein an edge of the connection graph corresponding to the port login request connects a first vertex corresponding to the originating port and a second vertex corresponding to the receiving port.

11. The method of claim 1, wherein an element of the storage system is selected from the group consisting of a host, a storage controller, a storage subsystem, and a storage device.

12. A computer program product comprising:
one or more computer readable storage media and program instructions stored on the one or more computer readable storage media, the program instructions comprising instructions to:
monitoring, via one or more processors, port login requests initiated by elements of a storage system, the storage system comprising interconnection cabling, the elements comprising at least one host and at least one controller;
determining, via one or more processors, one or more port identifiers and a device identifier for each of the port login requests;
constructing from the one or more port identifiers and the device identifier for each of the port login requests, via the one or more processors, a connection graph corresponding to the port login requests, wherein each edge of the connection graph corresponds to a specific port login request and each vertex of the connection graph corresponds to a port within the storage system;

analyzing the connection graph to determine expected or unexpected changes between hosts, controllers, and storage devices or subsystems within the storage system, wherein expected or unexpected changes include missing or added vertices, missing or added edges, and changed edge to vertex connections of the storage system; and storing one or more data packet latency performance metrics of the storage system, based on the expected or unexpected changes, to facilitate future comparisons and analysis of the storage system, wherein the performance metrics include data accessibility, bandwidth, latency, and fault tolerance of the at least one host and the at least one controller, and wherein the performance metrics are dynamic due to changing storage requirements, equipment failures, and equipment removal of the at least one host and the at least one controller.

13. The computer program product of claim 12, wherein the program instructions comprise instructions to determine a performance metric for the storage system.

14. The computer program product of claim 13, wherein the program instructions comprise instructions to associate the performance metric with the connection graph or the interconnection cabling.

15. The computer program product of claim 12, wherein the program instructions comprise instructions to determine changes in the connection graph from a previous connection graph.

16. The computer program product of claim 15, wherein the program instructions comprise instructions to inform a user of the changes.

17. A computer system comprising:
one or more computers;
one or more computer readable storage media and program instructions stored on the one or more computer readable storage media for execution by at least one of the computers, the program instructions comprising instructions to:
monitoring, via one or more processors, port login requests initiated by elements of a storage system, the storage system comprising interconnection cabling, the elements comprising at least one host and at least one controller;
determining, via one or more processors, one or more port identifiers and a device identifier for each of the port login requests;
constructing from the one or more port identifiers and the device identifier for each of the port login requests, via the one or more processors, a connection graph corresponding to the port login requests, wherein each edge of the connection graph corresponds to a specific port login request and each vertex of the connection graph corresponds to a port within the storage system;

analyzing the connection graph to determine expected or unexpected changes between hosts, controllers, and storage devices or subsystems within the storage system, wherein expected or unexpected changes include missing or added vertices, missing or added edges, and changed edge to vertex connections of the storage system; and storing one or more data packet latency performance metrics of the storage system, based on the expected or unexpected changes, to facilitate future comparisons and analysis of the storage system, wherein the performance metrics include data accessibility, bandwidth, latency, and fault tolerance of the at least one host and the at least one controller, and wherein the performance metrics are dynamic due to changing storage requirements, equipment failures, and equipment removal of the at least one host and the at least one controller.

18. The computer system of claim 17, wherein the program instructions comprise instructions to determine a performance metric for the storage system.

19. The computer system of claim 18, wherein the program instructions comprise instructions to associate the performance metric with the connection graph or the interconnection cabling.

20. The computer system of claim 17, wherein the program instructions comprise instructions to determine changes in the connection graph from a previous connection graph and inform a user of the changes.

* * * * *